(12) United States Patent
Beki

(10) Patent No.: US 7,997,616 B1
(45) Date of Patent: Aug. 16, 2011

(54) ROLLOVER PROTECTION SYSTEM FOR AUTOMOBILES

(75) Inventor: Gürkan Beki, Engelskirchen (DE)

(73) Assignee: ISE Automotive GmbH, Bergneustadt (DE)

( * ) Notice: Subject to any disclaimer, the term of this patent is extended or adjusted under 35 U.S.C. 154(b) by 0 days.

(21) Appl. No.: 12/708,511

(22) Filed: Feb. 18, 2010

(51) Int. Cl.
*B60R 21/13* (2006.01)

(52) U.S. Cl. ........................................................ 280/756

(58) Field of Classification Search .................. 280/756, 280/753, 751; 297/403, 410, 216.13
See application file for complete search history.

(56) References Cited

U.S. PATENT DOCUMENTS

| | | | |
|---|---|---|---|
| 5,655,791 A | 8/1997 | Nowack et al. | |
| 6,296,278 B1 * | 10/2001 | Zupancic et al. | 280/756 |
| 6,334,366 B1 | 1/2002 | Schuler et al. | |
| 6,352,285 B1 * | 3/2002 | Schulte et al. | 280/756 |
| 6,817,628 B2 * | 11/2004 | Hovelmann et al. | 280/756 |
| 2003/0205891 A1 | 11/2003 | Nass | |

FOREIGN PATENT DOCUMENTS

| | | |
|---|---|---|
| DE | 39 05 470 A1 | 12/1990 |
| DE | 197 12 955 A1 | 10/1998 |
| DE | 198 38 989 C1 | 11/1999 |
| DE | 199 16 678 C1 | 2/2001 |
| DE | 100 27 753 C1 | 9/2001 |
| DE | 10 2004 059 000 A1 | 6/2006 |
| EP | 1 359 059 A1 | 3/2003 |
| EP | 1 160 136 B1 | 8/2003 |

\* cited by examiner

*Primary Examiner* — Faye M. Fleming
(74) *Attorney, Agent, or Firm* — Flaster/Greenberg PC

(57) ABSTRACT

The invention relates to a rollover protection system for automobiles, comprising an extensible rollover body (1) held in an initial position by means of a holding device and secured against retraction, in a functional position by means of a locking device, and comprising an extension drive and an actuator (2) for releasing the holding device. Separate holding and locking devices are usually provided in such rollover protection systems, which is expensive both from a technological and an economic point of view. For simplification it is suggested according to the present invention that the holding device and the locking device be combined in one assembly (3). The assembly is arranged on the side adjacent to the rollover body (1) in a housing (16). The rollover protection system can be attached to the vehicle body by means of mounting elements (14 and 15), and the assembly (3) can be mounted in a position fixed on the vehicle. Upon extension of the rollover body (1), an engagement element of the assembly (3) engages the locking recess (6) of the rollover body (1).

20 Claims, 5 Drawing Sheets

ROLLOVER PROTECTION SYSTEM FOR AUTOMOBILES

BACKGROUND OF THE INVENTION

1. Field of the Invention

The present invention relates to a rollover protection system for automobiles, comprising an extensible rollover body held in an initial position by means of a holding device and secured against retraction, in a functional position by means of a locking device, and comprising an extension drive and an actuator for releasing the holding device.

Such rollover protection systems are used for the equipment of automobiles that do not offer sufficient protection for the passengers in case of a rollover, such as convertibles, where no roof is provided, or where the roof can be removed or folded away and where rigid, non-extensible rollover bodies are not desirable for aesthetic reasons.

The rollover bodies must be secured against inadvertent extension in a retracted initial position, and the extended rollover body must be secured against retraction in the functional position.

2. Description of Related Art

Mechanically biased springs or other stored-energy means which are blocked in the initial position by means of a releasable holding device, are used in many instances as an extension drive. In a similar way to airbags, a signal is generated by acceleration sensors, which triggers the activation of the rollover protection system, wherein the holding device is released by means of an actuator and the extension of the rollover body is enabled. Such a holding device is described in German Patent Specification 100 27 753 C1.

In the functional position, the extended rollover body is intended to support the overturned vehicle on the ground and to provide a protective space for the passengers. In this position, the rollover body must be locked against retraction, which is often realized by means of detent protrusions or the like biased in the engagement direction and automatically engaging a recess in the rollover body. Locking devices of this type are known from DE 100 27 753 C1 and DE 198 38 989 C1.

Hitherto the holding and locking functions have been treated as separate technical tasks, and thus separate devices have been designed for fixing the rollover body in the initial position and the functional position (cf. DE 100 27 753 C1). The technological and economic overhead is relatively high and a considerable drawback in the economic viability of such products.

BRIEF SUMMARY OF THE INVENTION

It is the object of the invention to simplify a rollover protection system of the initially mentioned type and, in particular, to make it cheaper.

To achieve this object, it is suggested according to the present invention that the holding device and locking device be combined in one assembly.

This is based on the idea that both devices have to fulfill nearly identical technical functions, namely to prevent a translational movement of the extensible rollover body both in the initial position and in the functional position, wherein, however, the securing effect must be conceived for opposed directions of movement.

The solution to the object is further based on the idea that for releasing the detent of the engagement element for the holding function, which is biased in the engagement direction by means of a spring, the force of the extension drive can be utilized, and that the actuator otherwise effecting the release of the detent only needs to be designed for a securing effect against release as long as the rollover protection system is not to be activated.

Taking these ideas into consideration, it is possible to combine the holding device and the locking device in one assembly able to fulfill both functions while almost halving the overhead needed.

In a further embodiment of the inventive idea, it is provided that the assembly is arranged adjacent to the rollover body in a position fixed to the vehicle and comprises a moveable blocking element, formed for engagement both in a holding recess and in a locking recess of the rollover body.

Furthermore, it is suitable if the blocking element designed for dual functions is biased in the engagement direction by means of a spring as in conventional holding devices and locking devices.

The blocking element is preferably equipped with separate elements for the holding function and the locking function. The engagement element for the holding function is secured against exiting the holding recess as long as the rollover protection system is not activated.

It is thus further provided that the holding engagement can be released by the actuator when the rollover protection system is activated.

In particular, the blocking element is moveable by the extension drive in the direction opposed to the engagement direction and the engagement element for the holding function can be driven to leave the holding recess when the rollover protection system is activated and the rollover body is extended into the functional position.

A particularly advantageous embodiment of the assembly is described in dependent claims 9 to 13.

BRIEF DESCRIPTION OF THE SEVERAL VIEWS OF THE DRAWING(S)

Further details are described more detailed with reference to FIGS. 1 to 5 of the drawing, wherein.

DETAILED DESCRIPTION OF THE INVENTION

Figure 1:
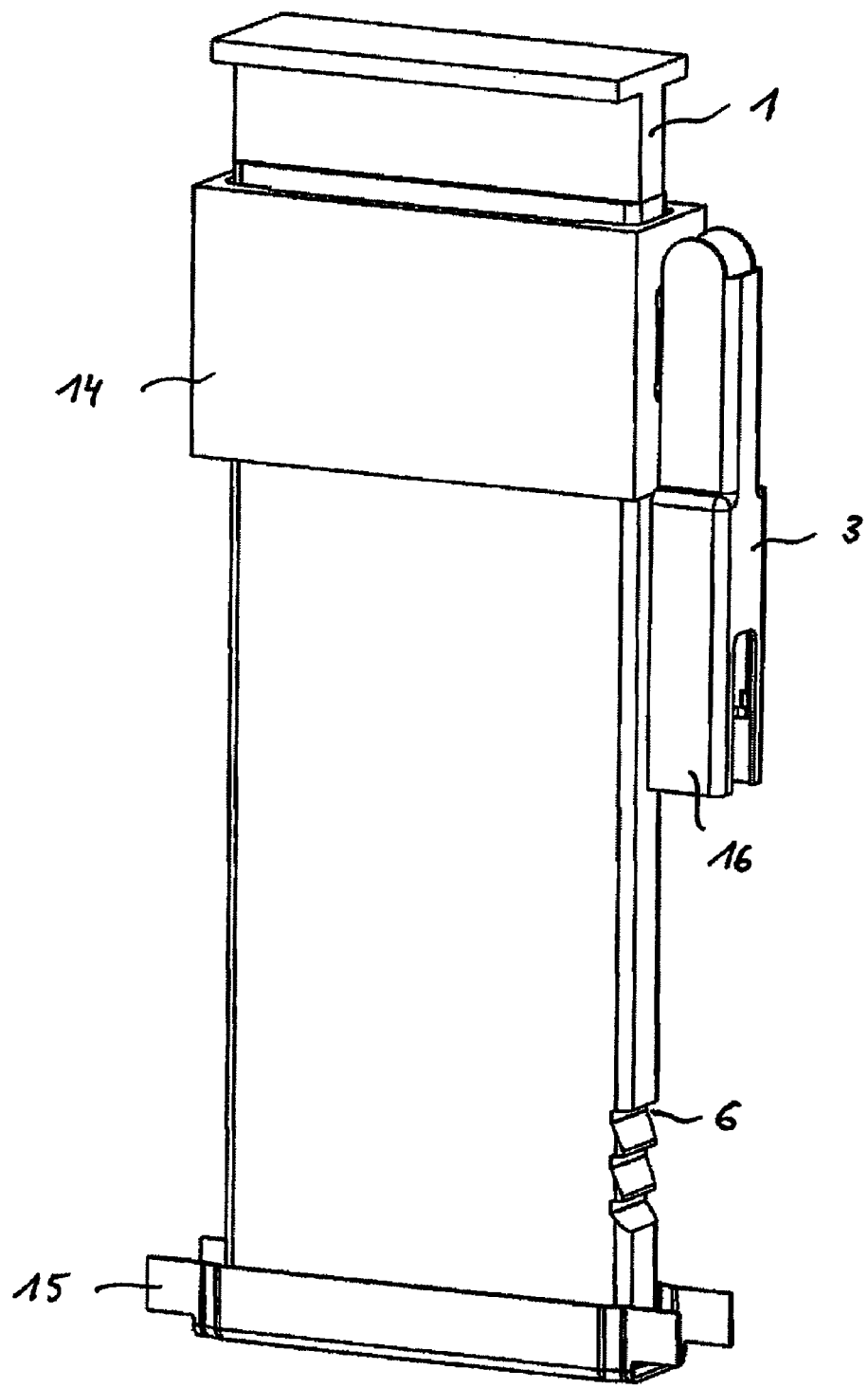
FIG. 1 shows a rollover protection system in the initial position.

The rollover protection system according to FIG. 1 comprises an extensible rollover body 1, which can be attached on the vehicle body by means of mounting elements 14 and 15. The holding device and the locking device are combined in assembly 3, arranged on the side of rollover body 1, which is accommodated in the closed housing 16. Locking recess 6 can also be seen at the bottom end of rollover body 1, which is usually formed as a plurality of recesses arranged one above the other to ensure that the rollover body 1 is secured against retraction even in a case where, for whatever reason, it does not entirely reach the predetermined functional position.

Figure 2:
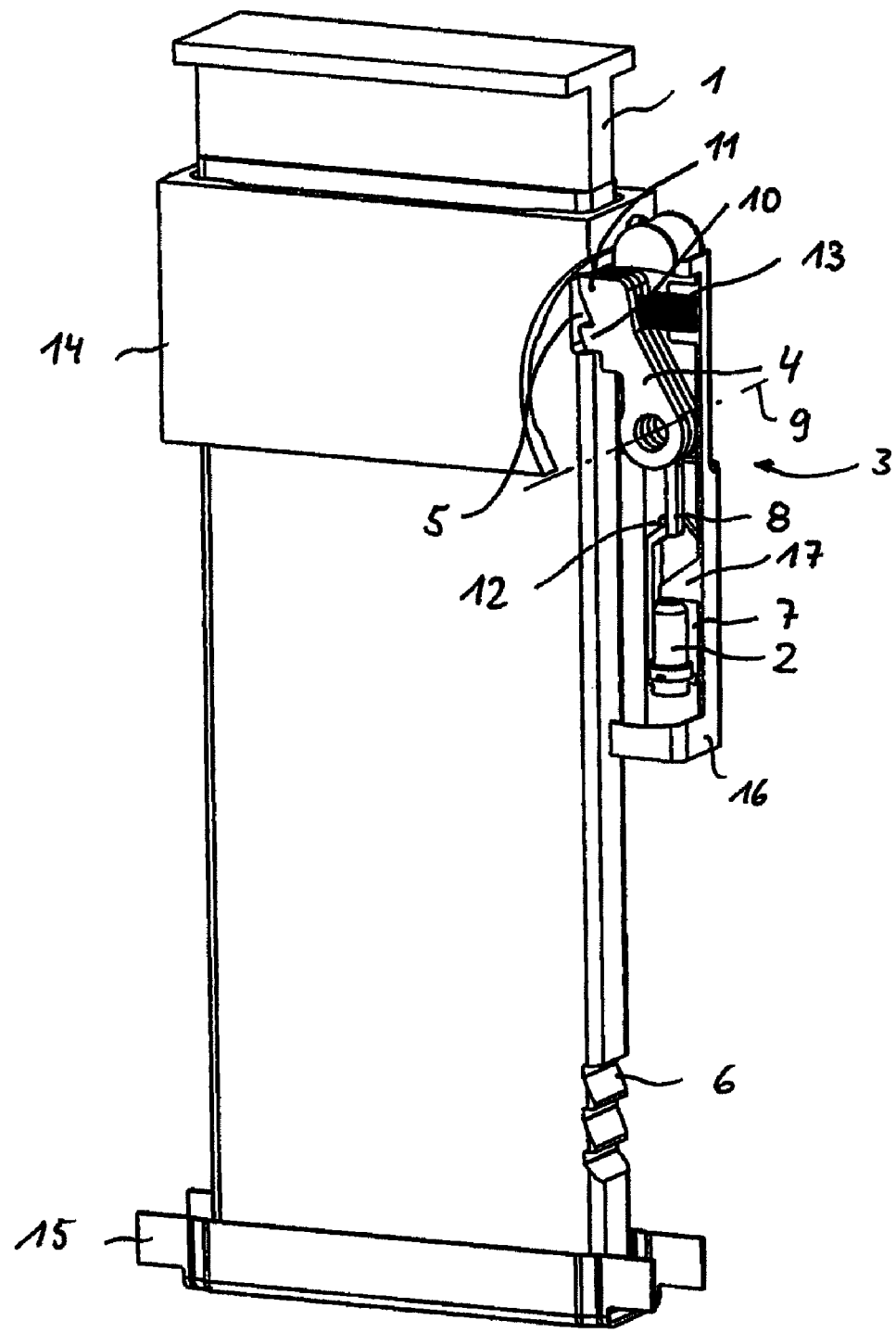
FIG. 2 shows the rollover protection system according to FIG. 1 with the housing of the assembly opened.

FIG. 2 shows the rollover protection system according to FIG. 1 with an open housing 16. Reference numerals 14, 15 and 6, again, show the mounting elements and locking recesses, respectively.

In the present exemplary embodiment, assembly 3 comprises a latch 4 pivotable about a pivoting axis 9, with an engagement element 10 for the holding function and an engagement element 11 for the locking function. Latch 4 is biased in the engagement direction by means of a spring 13. In the initial position shown engagement element 10 engages holding recess 5. Latch 4 is equipped with a lever 8 on the opposite side with respect to pivoting axis 9, which, in the position shown, is secured against pivoting in the direction opposed to the engagement direction by a holding member 12. Holding member 12 is part of a slide 7 supported in a manner downwardly displaceable by actuator 2 supported on a shoulder 17, fixed to the housing, so that components 8 and 12 come out of engagement.

Figure 3:
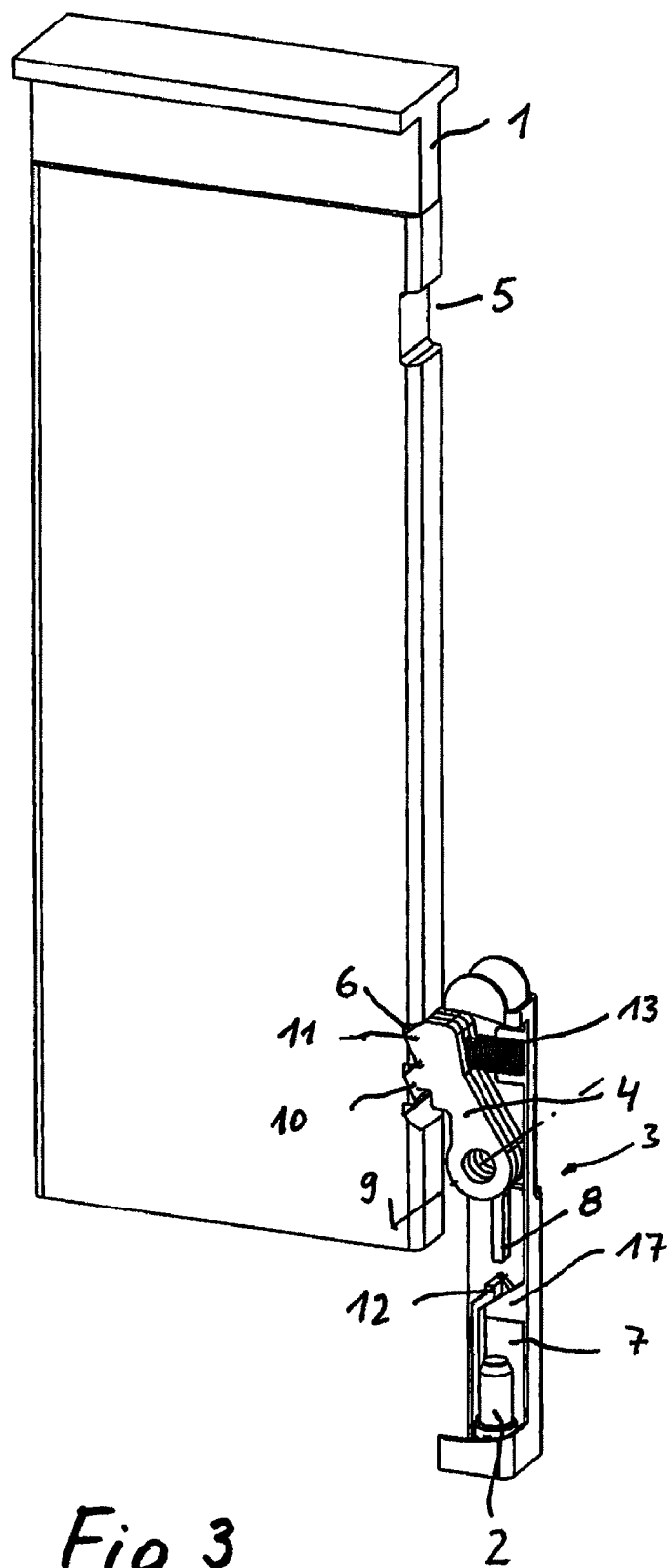
FIG. 3 shows a rollover body in the functional position.

FIG. 3 shows rollover body 1 in the extended functional position. The holding recess is arranged near the upper end. After components 8 and 12 have come out of engagement by displacing slide 7 downward by the actuator, it is possible to pivot latch 4 about axis 9 in the direction opposed to the engagement direction by the extension drive (not shown) and to extend rollover body 1 in the functional position shown. In this position, rollover body 1 is locked by the latch biased by spring 13 in the engagement direction by engagement element 11 engaging in locking recess 6.

Figure 4:
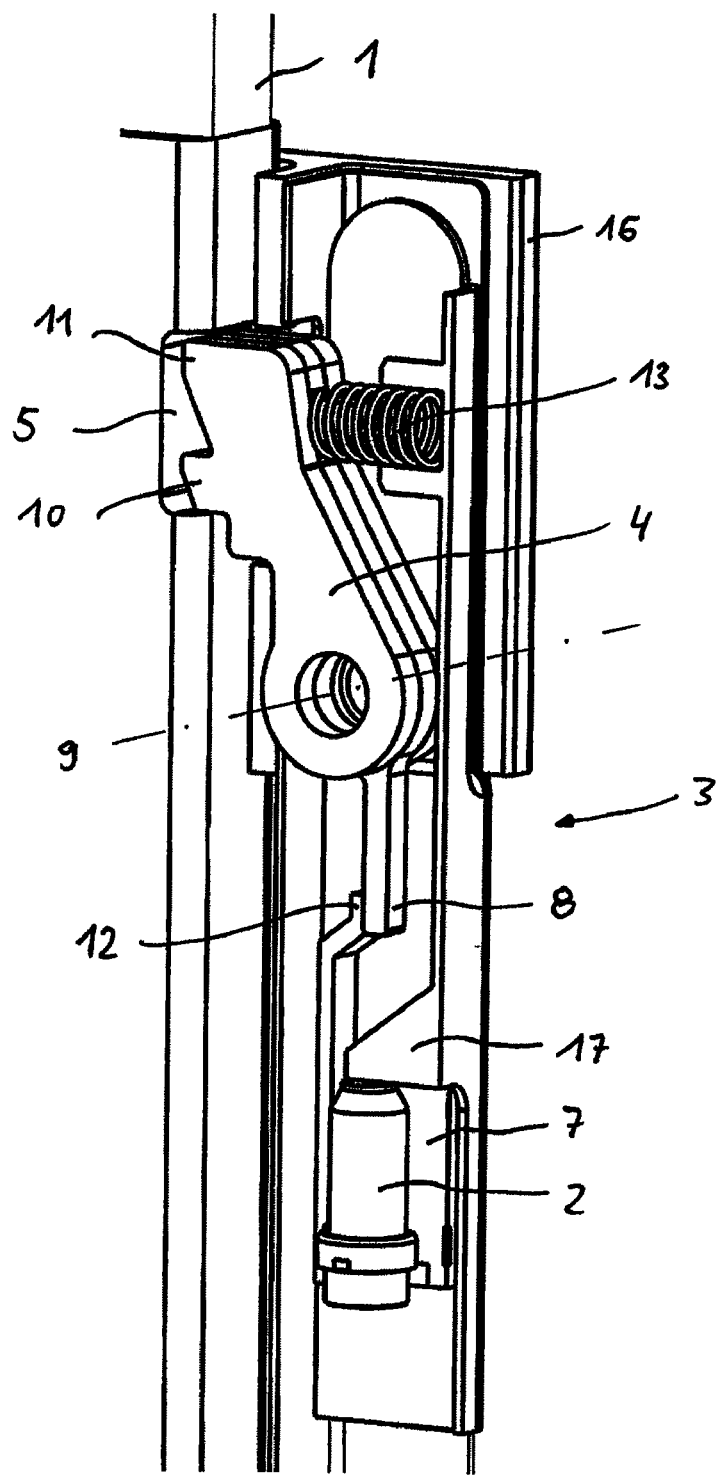
FIG. 4 is an enlarged view of the holding device in engagement.
Figure 5:
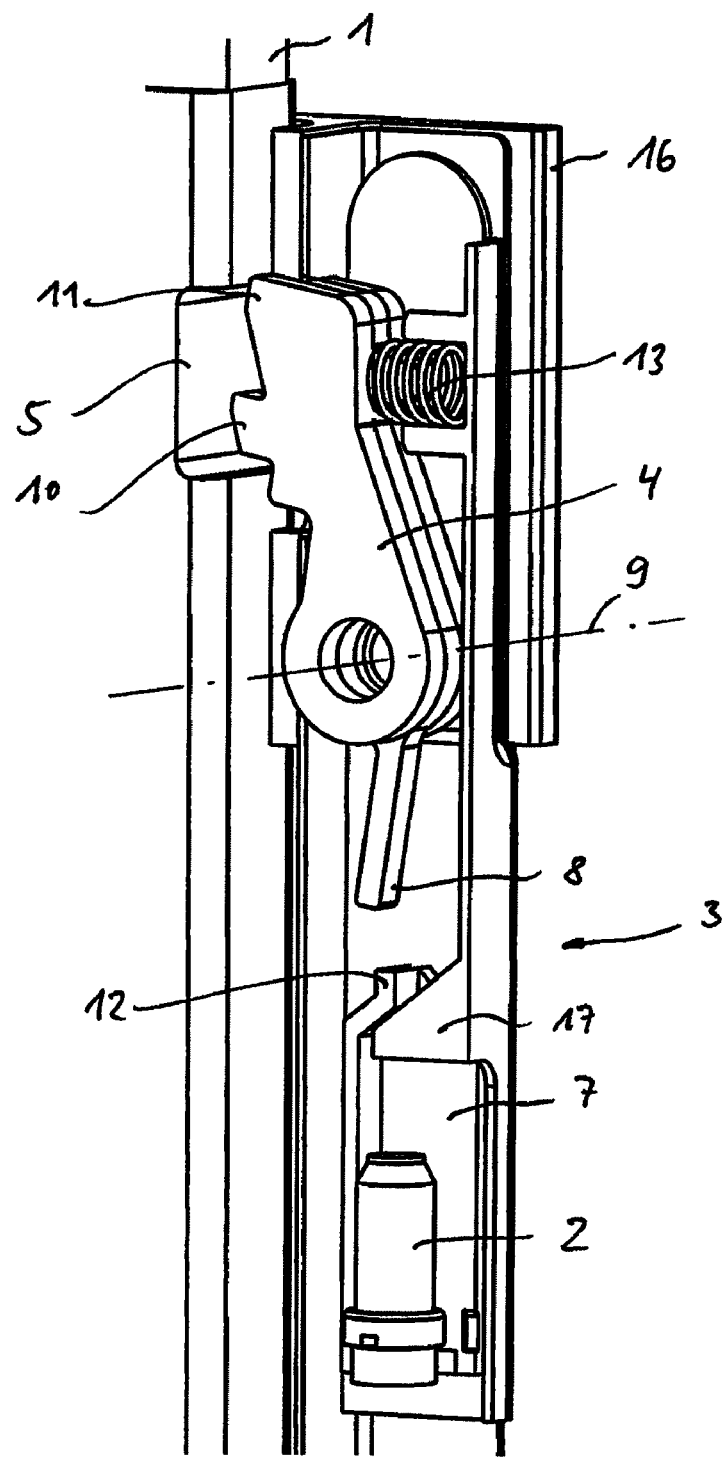
FIG. 5 shows the holding device after releasing the engagement securing means.

FIGS. 4 and 5 show the exemplary embodiment of assembly 3 according to the present invention again in an enlarged view. All reference numerals have the same meaning as in FIGS. 1 to 3. From FIG. 4 it can be seen that lever 8 is in contact with holding member 12, and that by these means latch 4 is secured against pivoting in a direction opposed to the engagement direction. When slide 7, and therefore holding member 12, is traversed downwards by actuator 2, supported on shoulder 17, components 8 and 12 come out of engagement, and latch 4 can be pivoted about axis 9 in the direction opposed to the engagement direction, while further compressing spring 13. According to the invention this is done by utilizing the extension drive (not shown), which develops a substantially greater force than spring 13 and which presses engagement element 10 out of holding recess 5 as rollover body 1 is extended. To avoid undue repetition, the other reference numerals are not described again.

I claim:

1. A rollover protection system for a vehicle, comprising an extensible rollover body held in an initial position by a holding device and secured against retraction in a functional position by a locking device, and comprising an extension drive and an actuator to release the holding device, wherein the holding device and the locking device are combined in one assembly and the assembly comprises a movable blocking element which is formed for engagement both in a holding recess and in a locking recess of the rollover body.

2. The rollover protection system according to claim 1, wherein the assembly is arranged adjacent to the rollover body in a position fixed to the vehicle.

3. The rollover protection system according to claim 1, wherein the blocking element is biased in an engagement direction by means of a spring.

4. The rollover protection system according to claim 1, wherein the blocking element comprises an engagement element for a holding function and an engagement element for a locking function.

5. The rollover protection system according to claim 4, wherein the engagement element for the holding function is secured against exiting the holding recess.

6. The rollover protection system according to claim 5, wherein the holding engagement element can be released by the actuator, when the rollover protection system is activated.

7. The rollover protection system according to claim 6, wherein the blocking element is moveable in a direction opposed to an engagement direction by the extension drive, and the engagement element for the holding function can be driven out of the holding recess when the rollover protection system is activated and the rollover body is extended into the functional position.

8. The rollover protection system according to claim 1, wherein the blocking element is a latch pivotable about a pivoting axis, which is secured against a pivoting movement in the direction opposed to an engagement direction by the actuator.

9. The rollover protection system according to claim 8, wherein the pivoting movement is blocked by a holding member, which in case of activation can be brought out of engagement by the actuator.

10. The rollover protection system according to claim 8, wherein the latch is integrally formed with a lever, arranged opposite engagement elements of the latch with respect to the pivoting axis and which, in the initial position, with its end face, is in contact with a displaceable holding member.

11. The rollover protection system according to claim 10, wherein the holding member is part of a slide, which in the case of activation is displaceable by the actuator in such a manner that the lever is released by the holding member and the latch is pivotable in the direction opposed to the engagement direction.

12. The rollover protection system according to claim 11, wherein the engagement element of the latch biased in the engagement direction by the spring engages the engagement recess for the locking function, when the rollover body has reached the functional position.

13. A rollover protection system for automobiles, comprising a linearly extensible rollover body held in an initial position by a holding device and secured against retraction in a functional position by a locking device, and comprising an extension drive and an actuator for releasing the holding device, wherein the holding device and the locking device are combined in one assembly, wherein the assembly comprises a pivotable latch and a holding member displaceable by the actuator, wherein the latch
- includes engagement elements at its end face for the holding and locking functions,
- is biased in an engagement direction by means of a spring, and
- is integrally formed with a lever, which
  - is positioned opposite the engagement elements with respect to the pivoting axis, and
  - is secured in the initial position in contact with the holding member at its end face against a pivoting movement in a direction opposed to the engagement direction.

14. The rollover protection system according to claim 13, wherein a recess for the engagement elements is formed on the rollover body.

15. The rollover protection system according to claim 14, wherein the engagement element for the holding function can be driven out of the holding recess by the extension drive of the rollover body in the direction opposed to the engagement direction.

16. The rollover protection system according to claim 13, wherein the engagement element for the holding function can be driven out of the holding recess by the extension drive of the rollover body in the direction opposed to the engagement direction.

17. The rollover protection system according to claim 13, wherein the holding member is part of a slide displaceable by the actuator in the case of activation in such a manner that the lever is released by the holding member and the latch is pivotable in the direction opposed to the engagement direction.

18. The rollover protection system according to claim 14, wherein the holding member is part of a slide displaceable by the actuator in the case of activation in such a manner that the lever is released by the holding member and the latch is pivotable in the direction opposed to the engagement direction.

19. The rollover protection system according to claim 15, wherein the holding member is part of a slide displaceable by the actuator in the case of activation in such a manner that the lever is released by the holding member and the latch is pivotable in the direction opposed to the engagement direction.

20. The rollover protection system according to claim 16, wherein the holding member is part of a slide displaceable by the actuator in the case of activation in such a manner that the lever is released by the holding member and the latch is pivotable in the direction opposed to the engagement direction.

* * * * *